Oct. 10, 1933.  G. E. DAVIS  1,929,677
DUAL ROTARY KITCHEN CABINET
Filed Aug. 29, 1931
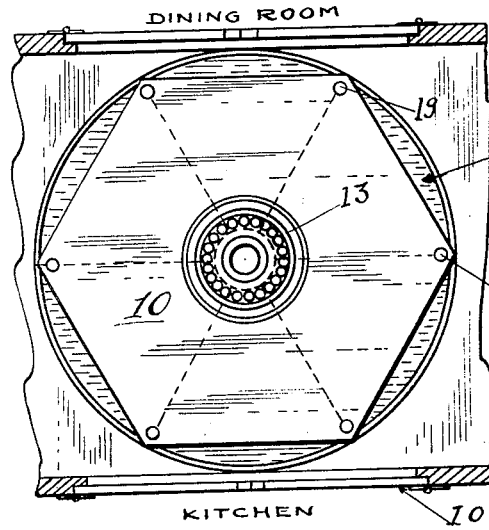
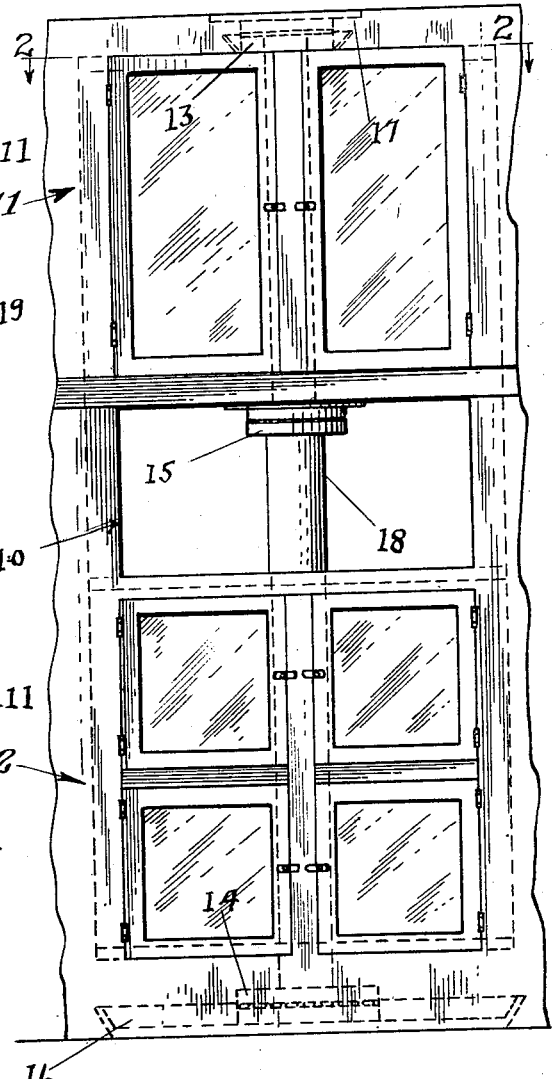
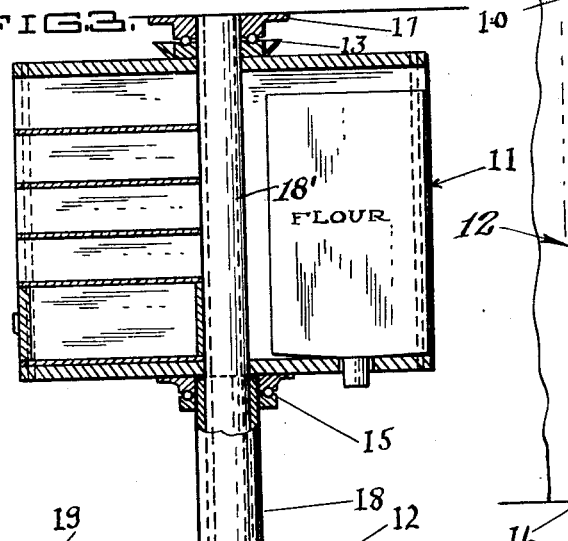
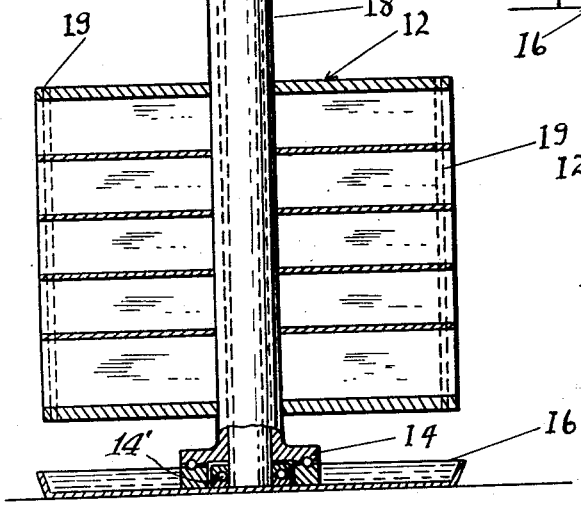
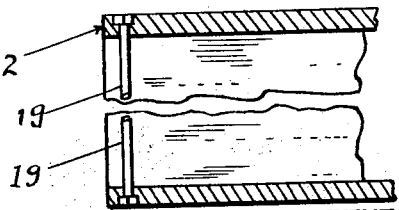
INVENTOR.
GEORGE E. DAVIS.
BY
*A. O. Carrillo.*
ATTORNEY Patented Oct. 10, 1933

1,929,677

UNITED STATES PATENT OFFICE 1,929,677

DUAL ROTARY KITCHEN CABINET

George E. Davis, San Francisco, Calif.

Application August 29, 1931. Serial No. 560,066

1 Claim. (Cl. 312—157)

The present invention relates generally to improvements in kitchen cabinets but more particularly to improvements in dual rotary kitchen cabinets in which the operator may have access thereto either from the kitchen or the adjacent dining room.

The primary object of the invention is to provide a cabinet of the class indicated that is hexagonal shaped and which embodies a combined kitchen cabinet and serving board.

Another object of the invention is the provision of a dual rotary kitchen cabinet having a plurality of drawers and bins.

An additional object of the invention is to provide a dual rotary kitchen cabinet of the class indicated which embodies a plurality of upper and lower bins and drawers to which the operator may have access either from the kitchen or dining room.

Additional to the foregoing objects is a dual rotary kitchen cabinet that is cheap to manufacture, compact and easy to operate.

Other objects and advantages of the invention will become apparent with reference to the subjoined specification and the accompanying one sheet of drawings in which:—

Figure 1 is a front view illustrating the dual rotary kitchen cabinet as shown with a portion of the wall or partition;

Figure 2 is a top plan view of the dual rotary kitchen cabinet taken at the line 2—2 in Figure 1;

Figure 3 is a vertical sectional view of my dual rotary kitchen cabinet per se;

Figure 4 is a detail view of the construction in which the ends of the bin or drawer recesses or guides are fastened together.

Referring more particularly to the drawing in which the preferred form of the invention is illustrated the device consists broadly of dual rotary cabinet 10 per se having an upper cabinet 11 and a lower cabinet 12 which are rotatably carried by bearings 13, 14 and 15, the said bearings being mounted on the bearing supports 16, 17 and 18.

Referring more particularly to Figures 1, 2, 3 and 4, the dual rotary kitchen cabinet comprises a cabinet 10 which is arranged in two sections 11 and 12 and which are independent of each other.

The lower part of my dual rotary kitchen cabinet 12 is provided with a suitable bearing 14 said bearing being supported by a base board 16;

The upper part of the cabinet 11 is supported by suitable bearings 13 and 15 and is mounted on a tubular member 18 which is supported at its extreme lower end by a suitable bearing 14 as clearly indicated in Figures 1, 2 and 3 respectively;

The support 18 is the main supporting column and is hollow as indicated in Figure 3, said column 18 having a second independently rotatable column 18' mounted therein and supporting the upper cabinet 11 through the medium of the bearings 14' and rotatable section 15' of the bearing 15.

The bearing 13 is fixed to the column 18' and the bearing 17 is fixed to the building structure. Bearings 14, 14' and 15 and 15' act as thrust bearings and support the weight of both upper and lower cabinets 11 and 12 so that said cabinets are freely rotatable relative to each other and to the structure.

The upper and lower bins or draws are fastened together by the bolts 19 as indicated in Figures 2, 3 and 4, or any other suitable means;

In recapitulation:—

The operation of the dual rotary kitchen cabinet is as follows:

The operator standing in the kitchen may cause the cabinet to revolve to any one of the six sides by manually turning cabinets 11 and 12 affording access to any of the selected bins or draws as clearly indicated in Figure 3.

What I claim and desire to secure by Letters Patent of the United States is the following:

In a rotary cabinet of the class described comprising upper and lower rotatable cabinets, a main supporting column, an anti-friction thrust bearing rotatably supporting said column, a second column mounted in said supporting column and extending thereabove and having a thrust bearing supporting the same for rotatable movement relative to said supporting column, said lower cabinet being fixed to said main column and anti-friction bearings carried, respectively, by the upper end of said main column and the upper end of said second column and supporting said upper cabinet for rotatable movement relative to said lower cabinet.

GEORGE E. DAVIS.